United States Patent [19]

Ajmera

[11] Patent Number: 4,871,507
[45] Date of Patent: Oct. 3, 1989

[54] METHOD FOR FORMING HOLLOW PARTIALLY CRYSTALLINE BIAXIALLY ORIENTED HEAT SET POLYETHYLENE TEREPHTHALATE ARTICLES

[75] Inventor: Prakash R. Ajmera, Toledo, Ohio

[73] Assignee: Owens-Illinois Plastic Products Inc., Toledo, Ohio

[21] Appl. No.: 198,723

[22] Filed: May 18, 1988

Related U.S. Application Data

[63] Continuation of Ser. No. 20,813, Mar. 2, 1987, abandoned.

[51] Int. Cl.[4] .................. B29C 49/18; B29C 49/48; B29C 49/64; B29C 49/66
[52] U.S. Cl. .................................. 264/521; 264/528; 264/529; 264/530; 425/526
[58] Field of Search ............... 264/521, 523, 528, 529, 264/530, 535, 542, 235, 346; 425/526, 530, 538

[56] References Cited

U.S. PATENT DOCUMENTS 4,233,022 11/1980 Brady et al. ................... 264/529
4,385,089 5/1983 Bonnebat ........................ 264/521

FOREIGN PATENT DOCUMENTS 57-12618 1/1982 Japan ............................ 264/521

Primary Examiner—Jan H. Silbaugh
Assistant Examiner—Neil M. McCarthy

[57] ABSTRACT

A method and apparatus of forming a hollow partially crystalline heat set biaxially oriented polyethylene terephthalate container having a hemispherical base comprising blowing a heated parison at orientation temperature outwardly against the confines of a mold which is at heat setting temperature wherein the side wall and the major portion of the base of the container are subjected to a heat setting temperature and the center of the base of the container is subjected to a temperature not greater than 150° C. so that the central portion is crystallized a substantially lesser amount than the side wall and the major portion of the base. The container is then quenched. The resultant container can be formed at a rapid cycle and has good drop impact properties and obviates the problems of sticking to the hot mold or blow out when the hot mold is opened.

10 Claims, 3 Drawing Sheets

México# METHOD FOR FORMING HOLLOW PARTIALLY CRYSTALLINE BIAXIALLY ORIENTED HEAT SET POLYETHYLENE TEREPHTHALATE ARTICLES This application is a continuation, of application Ser. No. 020,813, filed Mar. 2, 1987. now abandoned.

This invention relates to making hollow biaxially oriented heat set partially crystalline articles and particularly articles made of poly(ethylene terephthalate).

BACKGROUND AND SUMMARY OF THE INVENTION

It has heretofore been known that the thermal stability and barrier properties of oriented blow molded containers of poly(ethylene terephthalate) are significantly increased by heat setting. Typical processes for heat setting are shown in U.S. Pat. Nos. 4,476,170, 4,512,948 and 4,522,779.

In U.S. Pat. Nos. 4,476,170 and 4,512,948, there is disclosed an article and a process of making an oriented and heat set blow molded container of poly(ethylene) terephthalate. In the process, a preform preheated to a temperature suitable for orientation is biaxially stretched in a blow mold and then while the hollow container is still in contact with the blow mold walls, the article is raised to a higher heat setting temperature preferably in the range of 200°-250° C. (except for the neck) thus heat setting the container, and while the container is still at a shrinkage resisting pressure exceeding atmospheric, it is cooled in the same mold to a temperature at which it maintains its shape when not pressurized but not below 100° C. It is also particularly disclosed that this cooling step can be done in the air outside the mold while maintaining internal pressure. According to these patents, when the heat setting temperature of the hot mold ranges from 220°-250° C. and the quenching temperature is not below 100° C., higher onset-of-shrinkage temperatures are obtained.

In U.S. Pat. No. 4,522,779, there are disclosed improved plastic containers and a process for their production. In the first embodiment, a container is blow molded in a first hot blow mold, then reblown to a larger size in a second cold mold of larger volume than the first hot mold. Such containers are stated as having improved mechanical properties, particularly very high hoop yield stresses. However, the utilization of a larger volume cold mold substantially reduces the thermal stability. In the second embodiment, a container is blow molded in a hot blow mold, then reblown to a larger size in a second hot blow mold where it is blown to the confines of the second mold and the container is then removed from the second hot mold and transferred to a third cold mold and cooled to room temperature while maintaining internal pressure. In a further embodiment, the container is blow molded in a first hot mold, reblown in a second hot mold, and thereafter the second mold is cooled to cool the container.

U.S. Pat. No. 4,385,089 (British Patent Specification No. 1,604,203) is directed to heat set biaxially oriented hollow articles and states that the preform or parison should be heated at least to biaxially orientation temperature and maintained in closed contact with a hot mold which is at a temperature of up to 40° C. above the minimum orientation temperature. In one embodiment, the resultant molded hollow article is moderately cooled causing a temperature drop of 10°-30° C. by introducing cooling vapor or mist into the hollow article, interrupting the cooling vapor, and opening the mold. In another embodiment, the heat set article is allowed to shrink freely and then reblown in the same hot mold or in a separate cooled mold. The patent calls for a heat setting temperature of 40° C. above the orientation temperature which limits thermal stability and barrier properties.

According to this patent, the temperature of the hot mold should be maintained between 30° and 50° C. above the minimum orientation temperature of the plastic material. Otherwise, it is stated there are numerous disadvantages including lowering of the production rate, the danger of the appearance of major distortion and major shrinkage on mold release, the disadvantage inherent in heating metal molds to very high temperatures and keeping them at such temperatures, and the danger of crystallization which would cause a loss of transparency. Further, in accordance with this prior patent, excessive shrinkage is to be avoided and generally the temperature drop of 10° to 30° C. should be made. Accordingly, such a method precludes obtaining a degree of heat setting which would produce thermal stability at higher temperatures as may be required in filling the container with various products. In addition, such a method will preclude obtaining the higher degrees of crystallinity and resultant high barrier properties which are required for some products.

In copending application Ser. No. 923,503 filed Oct. 27, 1986 and now abandoned, there are disclosed improved plastic containers and a method for their manufacture. In this method, the container is blow molded in the first hot mold which is maintained at 130°-250° C., the container is in contact with the mold surface for a short period of time (1-10 sec.) which is sufficient to induce partial crystallization. The container is than maintained at lower internal pressure to prevent significant shrinkage and then the container is rapidly transferred into a cold mold having substantially the same volume or smaller volume than the hot mold. The temperature of the cold mold is maintained at 1°-100° C. The container is quenched in the cold mold. The method results in a theramlly stable container which has higher onset-of-shrinkage temperature and higher mechanical properties as required for hot fill applications. The method also provides lower cycle time.

Where the base of the container is complex such as having axially projecting portions so that it is free standing or has an inverted bottom, transfer from a hot mold to a cold mold, while the interior of the container is under pressure, tends to deform the bottom and cause it to revert to a hemispherical bottom. This tends to occur both when the blown container is maintained stationary and when the container is moved from a hot mold to a cold mold.

To overcome these problems in copending application Ser. No. 021,894, filed Mar. 4, 1987, filed concurrently herewith and pending there is disclosed a method for making a partially crystalline, biaxially oriented heat set hollow plastic container from a hollow parison having an open end and a closed end comprising engaging the open end of a plastic parison which is at a temperature within its molecular orientation temperature range, positioning a mold base in axial alignment with said engaged hot parison, enclosing a hot mold about the mold base, the mold being at heat setting temperature, expanding the plastic parison within the hot mold and mold base by internal pressurization to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container, reducing the internal pressure in the blown container, opening the hot mold while maintaining engagement of the open end and engagement of the mold base with the blown hollow container, maintaining a lower internal pressurization of the container to prevent significant shrinkage, and cooling the container while maintaining engagement of the open end and engagement of the mold base with the container and maintaining pressure in the container at least sufficient to prevent shrinkage.

In copending application Ser. No. 020,830, filed Mar. 2, 1987, filed concurrently herewith and now abandoned, there is disclosed a method for making a partially crystalline, biaxially oriented heat set hollow polyethylene terephthalate free standing container from a hollow parison having an open end and a closed end which comprises engaging the open end of a plastic parison which is at a temperature within its molecular orientation temperature range, positioning a mold base in axial alignment with said engaged hot parison, enclosing a hot mold about the mold base, the mold being at heat setting temperature and the mold base being at a temperature preferably significantly lower than the mold, expanding the plastic parison within the hot mold and mold base by internal pressurization to induce biaxial orientation of the plastic parison and force the plastic parison into intimate contact and conformance with the hot mold and to maintain contact by such internal pressurization between the mold and mold base and the biaxially oriented container for a time sufficient to induce partial crystallization in the side wall and base of the biaxially oriented container, reducing the internal pressure in the blown container, opening the hot mold while maintaining engagement of the open end of the blown hollow container, maintaining a lower internal pressurization of the container to prevent significant shrinkage, and engaging a cold mold base with the base of the container, and enclosing a cold mold about the container to cool the container while maintaining engagement of the open end with the container and maintaining pressure in the container at least sufficient to prevent shrinkage.

U.S. Pat. No. 4,233,022 discloses a method and apparatus in which a parison is blown and heat treated in a single hot mold. After blowing, the blowpressure is preferably maintained in the interior of the blown article in order to resist heat shrinkage during the heat treating and to maintain the material against the cavity wall. Selected portions of a biaxially oriented hollow bottle are heated while cooling other portions. More specifically, the body is differentially heat treated while less oriented portions such as the finish or the heel are either cooled or heat treated. According to the patent, the body of the bottle is heated to a temperature within the range of 150° C. to 220° C. for heat treating. According to the patent, the bottom of the bottle may be cooled in the event that very little molecular orientation is developed or alternatively may be heated to a temperature within the range of from 100° C. to 200° C. if heat treating is appropriate. The remaining less oriented portions such as the bottom are cooled or heat treated. As described, the heat treating cycle may range between 10 seconds to about 10 minutes. After heat treating, coolant fluid is circulated through ducts in the mold to cool the article to self-sustaining condition. Added cycle time is required after heat treating to cool mold from the heat treating temperature to the cooling temperature. Thus, the method requires a high overall cycle time due to the time for heat setting and the time necessary for cooling the mold and then for cooling the container to self-sustaining condition before removal from the mold.

In copending application Ser. No. 909,800 filed Sept. 22, 1986 and now abandoned, a method for making a partially crystalline, biaxially oriented heat set hollow palstic container from a hollow parison having an open end and a closed end comprising engaging the open end of a plastic parison which is at a temperature within its molecular orientation temperature range, enclosing the hot parison in a hot mold, which is at heat setting temperature, expanding the plastic parison within the hot mold by internal pressurization to induce biaxial orientation of the plastic parison and to induce partial crystallization in the biaxially oriented container, exhausting the blow molding fluid while continuously introducing a cooling fluid such as liquid carbon dioxide into the biaxially oriented container and continuously removing the cooling fluid while the hot mold is closed for a period of time, opening the hot mold while continuing to introduce, circulate and remove coolant fluid for a predetermined period of time until the container is cooled sufficiently to prevent significant shrinkage and finally releasing the container.

When a parison is blown to form a biaxially oriented hollow container having a hemispherical base, the central portion of the base of the container comprising the center, known as the gate area, and the portion surrounding the gate areas remains essentially unoriented and amorphous and is also much thicker than the remainder of the base and the side wall. When such a container is heat set at heatsetting temperatures, the center portion of the resultant container tends to stick to the hot mold. When the hot mold is opened and when the container is still under a lower internal pressure, which is provided to prevent shrinkage, the central portion of the base of the container tends to blow out. Further, the resultant heat set container has poor drop impact properties.

All of the above problems lead to unacceptable containers which must be rejected and therefore substantially lessens productivity.

Accordingly, among the objectives of the present invention are to provide a method and apparatus of making partially crystalline biaxially oriented heat set polyethylene terephthalate containers having hemispherical bottoms at increased productivity and which have satisfactory impact properties without the problems of sticking and blow out; and which method can be applied to heat setting methods utilizing a hot mold and a cold mold or a single mold with external or internal cooling.

In accordance with the invention, the method and apparatus of forming a hollow partially crystalline heat set biaxially oriented polyethylene terephthalate container having a hemispherical base comprises blowing a heated parison at orientation temperature outwardly against the confines of a mold which is at heat setting temperature wherein the side wall and the major portion of the base of the container are subjected to a heat setting temperature and the center of the base of the container is subjected to a temperature not greater than 150° C. so that the central portion is crystallized a substantially lesser amount than the side wall and the major portion of the base. The container is then quenched. The resultant container can be formed at a rapid cycle and has good drop impact properties and obviates the problems of sticking to the hot mold or blow out when the hot mold is opened.

DESCRIPTION

Figure 1:
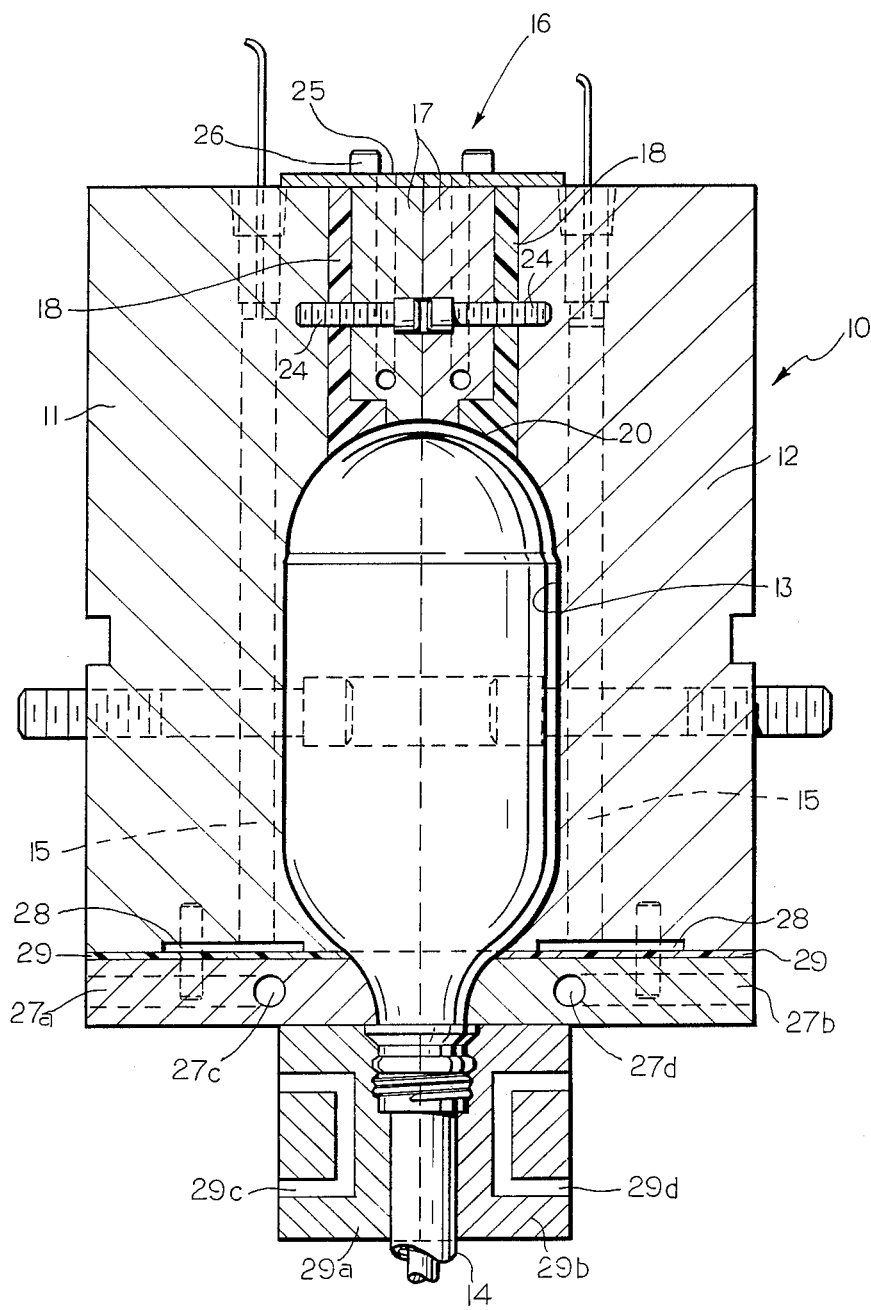
FIG. 1 is a sectional view of a mold embodying the invention.
Figure 2:
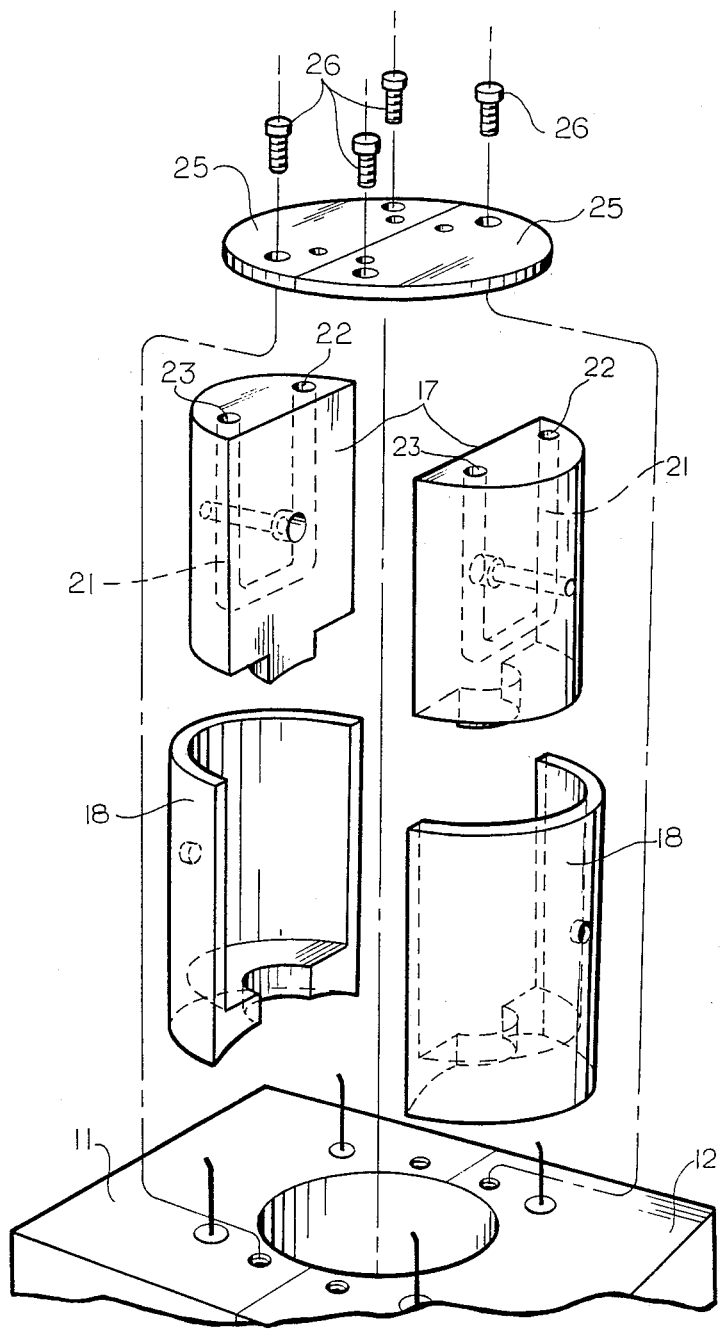
FIG. 2 is a fragmentary exploded view of a portion of the mold shown in FIG. 1.

The present invention is directed to well known methods of forming a biaxially oriented heat set partially crystalline polyethylene terephthalate hollow container wherein a hot parison at orientation temperature is blown outwardly against the confines of a hot mold which is at heat setting temperature and the container is then quenched.

In accordance with the invention, the method of forming a biaxially oriented heat set partially crystalline polyethylene terephthalate container having a hemispherical bottom calls for controlling the temperature of the hot mold such that the center only of the base of the container is heat set at a temperature not greater than 150° C.

More specifically, in accordance with the invention, the method of forming a hollow partially crystalline heat set biaxially oriented polyethylene terephthalate container having a hemispherical base comprises blowing a heated parison at orientation temperature outwardly against the confines of a mold which is at heat setting temperature wherein the side wall and the major portion of the base of the container are subjected to a heat setting temperature and the center of the base of the container is subjected to a temperature not greater than 150° C. so that the central portion is crystallized a substantially lesser amount than the side wall and the major portion of the base. The container is then quenched. The resultant container can be formed at a rapid cycle and has good drop impact properties.

The method can be utilized in heat setting methods utilizing a hot mold for blowing and heat setting and a cold mold for quenching as in U.S. Pat. No. 4,522,779 and the aforementioned copending applications Ser. Nos. 923,503 and 021,894, filed Mar. 4, 1987, OI Docket No. 15994, and application Ser. No. 020,830, filed Mar. 2, 1987, OI Docket No. 16007, filed concurrently herewith; or a method utilizing a single mold which is first heated and then cooled as in U.S. Pat. Nos. 4,476,170, 4,512,948 and 4,233,022; or the method utilizing a hot mold and internal quenching as disclosed in the aforementioned application Ser. No. 909,800; all of which are incorporated herein by reference.

The method can be utilized with a hot mold and a cold mold wherein the cold mold is larger than the hot mold, as described in the aforementioned U.S. Pat. No. 4,522,779; or wherein the cold mold has the same volume as the hot mold, or smaller volume, as described in the above-identified pending U.S. application Ser. No. 923,503, which are incorporated herein by reference.

Where the method of U.S. Pat. No. 4,522,779 is utilized, the resultant container exhibits improved mechanical properties but will have lower onset-of-shrinkage and reduced hot filling capability. The container can be utilized when the contents are pressurized.

Where the method of U.S. application Ser. No. 923,503 is utilized, the resultant container will have a higher onset-of-shrinkage temperature and therefore the container can be hot filled at higher temperatures.

If desired, an axial stretch may be applied to the parison by use of a stretch rod either before expanding the parison or simultaneously with the expanding of the parison, as is well known in the art.

Although the invention preferably utilizes a hot mold and a cold mold, some of the advantages are obtained wherein the cooling is achieved without the use of a cold mold, as when a hot mold is cooled while maintaining engagement of the container by internal pressurization or as where opening the hot mold and cooling the container externally while maintaining internal pressurization, as described in U.S. Pat. Nos. 4,476,100 and 4,512,948, which are incorporated herein by reference. These methods require greater cycle time than the methods utilizing a hot and cold mold or internal cooling as in the aforementioned patent applications.

Although the method has been described by utilizing parisons which are heated and then blown and heat set, some of the advantages are also applicable to heat setting previously blown containers which are positioned between the halves of a hot mold to heat set the container and then transferred to a cold mold while maintaining engagement of the neck and bottom.

Referring to FIG. 1, a novel hot mold 10 utilized in the method comprises sections 11, 12 that define a mold cavity 13 in which a tubular parison is expanded against the confines of the mold by a fluid pressure through a blow pin assembly 14.

Each half 11, 12 of the mold is provided with circumferentially spaced axially extending electrical heating elements 15 which heat the mold to the heat setting temperature at which the biaxially blown plastic container will be heat set. In accordance with the invention an insert assembly 16 is provided at the center of the base or gate area of the closed container that is formed and is constructed and arranged such that the center of the formed container engages a portion of the mold which is at a temperature substantially less than the temperature of the side walls of the mold.

The insert 16 comprises semi-cylindrical elements 17 made of metal and having their lower ends defining a surface 20 which is complementary to the hemispherical bottom of the container. The elements 17 are thermally insulated from the mold sections 11, 12 by semi-cylindrical plastic elements 18 made, for example, of glass filled Teflon (polytetrafluoroethlene), the lower ends of which also conform to the bottom of the container which is to be formed so that the elements 17 and insulator portions 18 cooperate with the mold halves 11, 12 to define the full hemispherical bottom of the container.

Each of the elements 17 is provided with a coolant passageway 21 having an inlet 22 and an outlet 23 for cooling the elements 17 to a lower temperature than the temperature of the side walls of the container so that the bottom central portion of the container is heat set to a substantially lesser degree than the side walls. Bolts 24 hold the elements 17 and insulator portions 18 in position in each mold half. Semi-cylindrical plates 25 held in position by screws 26 are positioned on the ends of inserts 17 and have openings aligned with the openings 22, 23 in inserts 17. The mold includes shoulder defining portions 27a, 27b that are insulated by air gaps 28 and a plastic layer 29, such as glass filled Teflon, from the mold portions 11, 12. Neck ring portions 29a, 29b through which the blow pin assembly 14 extends. Shoulder portions 27a, 27b include a coolant passage 27c, 27d and neck ring portions 29a, 29b include a coolant passage 29c, 29d.

In use, a hot parison of blow moldable plastic that is capable of being biaxially oriented and heat set is held in position by the clamp ring halves 29a, 29b and blown outwardly by expansion of a fluid through the blow pin assembly 14 against the confines of the mold to form a biaxially oriented container. The pressure in the container is maintained to hold the side wall and bottom wall of the container against the confines of the mold and thereby cause partial crystallization and heat setting thereof.

Figure 3:
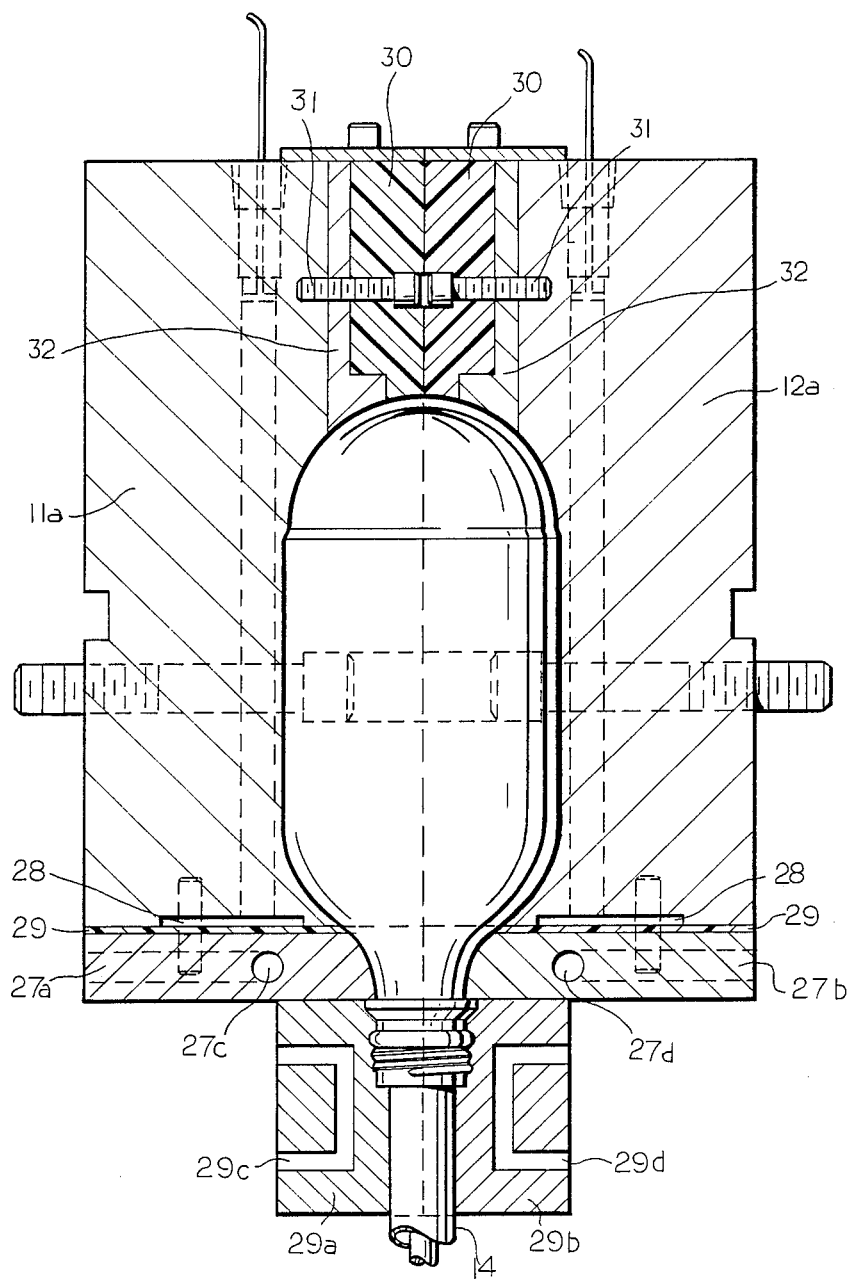
FIG. 3 is a sectional view of a modified form of mold.

In the form of mold shown in FIG. 3, the insert 17a is in the form of two semi-cylindrical plastic elements 30, made of suitable plastic such as glass filled Teflon, the lower ends of which conform to the center of the container being blown that are held in position by bolts 31 extending through metal retaining elements 32. In this form, the size and shape of the elements 30 is designed so that the elements 30 absorb a minimum of heat bringing the central portion of the mold to a temperature substantially less than the side walls of the mold and achieving the lesser crystallization as desired.

The temperature of insert 30 is determined by the temperature of the mold sections 11, 12, the heat transfer coefficient between the metal of the mold sections and the plastic of the insert 30 and the contact area between the insert 30 and the mold sections 11, 12. For a given material and heat transfer area, at equilibrium conditions, the insert will have a predetermined temperature which is substantially less than the temperature of the mold sections 11, 12. In order to change the temperature of the insert 30 relative to the temper of the mold sections 11, 12, the material and the heat transfer area of the insert 30 is changed to result in a different temperature at equilibrium conditions.

The ratio of diameter of the central area at the center of the base of the hemispherical container to the diameter of the base preferably ranges between about 0.2 to 0.4.

It has been found that when the central portion of the base of the hemispherical container is subjected to a temperature not greater than 150° C. while the major portion of the base and the side wall are subjected to heat set temperatures, the problems heretofore encountered are eliminated. The drop impact of the hemispherical container is improved, blowouts in the bottom are avoided and the sticking the material in the bottom of the mold is eliminated.

The process of the present invention, as well as the product, is especially concerned with polymers of polyethylene terephthalate having an inherent viscosity of at least 0.6. Polyethylene terephthalate polymers useful in the present invention include repeating ethylene terephthalate units with the remainder being minor amounts of ester-forming components and copolymers of ethylene terephthalate wherein up to about 10 mole percent of the copolymer is prepared from the monomer units selected from butane-1,4-diol; diethylene glycol; propane-1,3-diol; poly tetramethylene glycol); poly ethylene glycol); poly(propylene glycol); 1,4-hydroxymethylcyclohexane and the like, substituted for the glycol moiety in the preparation of the copolymer, or isophthalic; naphthalene 1,4- or 2,6-dicarboxylic; adipic; sebacic; decane-1,10-dicarboxylic acids, and the like, substituted for up to 10 mole percent of the acid moiety (terephthalic acid) in the preparation of the copolymer.

Of course, the polyethylene terephthalate polymer can include various additives that do not adversely affect the polymer. For instance, some such additives are stabilizers e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the polyethylene terephthalate.

The process is also applicable to multilayer parisons comprising an orientable polyethylene terephthalate and other polymers which provide desirable barrier properties wherein the orientable heat settable polymer comprises a major portion of the total weight, preferably at least 70%. Typical examples are multilayer parisons of polyethylene terephthalate and copolyester; polyethylene terephthalate, nylon and copolyester; polyethylene terephthalate, adhesive, nylon, glue and polyethylene terephthalate.

The process is also applicable to blends of polyethylene terephthalate with polymers which provide desirable barrier properties wherein the polyethylene terephthalate comprises a major portion of the total weight, preferably at least 70% of the total weight.

Thus, as used herein in the specification and claims, the term polyethylene terephthalate is intended to include the above polyethylene terephthalate containing materials.

The following Table I summarizes the parameters for producing satisfactory results.

TABLE I

| | |
|---|---|
| 1. Heatset temperature | 120–250° C. |
| 2. Heatset time | 1–10 seconds |
| 3. Temperature of the insert | 1–150° C. |
| 4. Quench temperature | 1–100° C. |
| 5. Quench time | 0.5–10 seconds |

The following tests have been conducted in accordance with the method utilizing a hot mold and a cold mold wherein the hot mold included the controlled heating of the hemispherical base.

Table II summarizes the drop tests of containers made in accordance with the invention and containers made by other methods, namely, a hot mold and a cold mold and a single mold which was alternately heated and cooled. In other methods, the temperature of the central portion was 230° C., while in the method of the present invention the temperature of the central portion was 150° C.

It can be seen from Table II that containers made in accordance with the invention provided satisfactory drop test characteristics while containers made by other methods failed. In addition, the containers made in accordance with the invention did not blow out or stick to the mold surfaces.

TABLE II

| | | Drop Tests | | | |
|---|---|---|---|---|---|
| DESCRIPTION OF | Non-post-stretched | Non-post-stretched | Post-stretched (hot | Non-heatset | Single mold |

TABLE II-continued

| | Drop Tests | | | | |
|---|---|---|---|---|---|
| HEATSET PROCESS | (same size hot and cold molds) | (same size hot and cold molds) | mold 30% smaller than cold mold) | | cooled |
| DESCRIPTION OF INSERT | No Teflon insert | Teflon insert | Teflon insert | — | No Teflon insert |
| HEATSET TEMPERATURE | 230° C. | 230° C. | 230° C. | 25° C. | 230° C. |
| TEMPERATURE CENTRAL PORTION | 230° C. | 150° C. | 150° C. | — | 230° C. |
| HEATSET TIME | 1.3 seconds | 1.3 seconds | 1.3 seconds | 1.3 seconds | 6 seconds |
| QUENCH TEMPERATURE | 25° C. | 25° C. | 25° C. | — | 100° C. |
| QUENCH TIME | 1.3 seconds | 1.3 seconds | 1.3 seconds | — | 240 seconds |
| TRANSFER PRESS | 25 psig | 24 psig | 24 psig | — | — |
| TRANSFER TIME | 7 seconds | 10 seconds | 10 seconds | — | — |
| TOTAL BOTTLES TESTED | 10 | 9 | 9 | 9 | 12 |
| FAILURES ≦4 feet | 10 | 0 | 0 | 0 | 12 |
| FAILURES ≦5 feet | | 0 | 0 | 0 | |
| FAILURES ≦6 feet | | 0 | 0 | 0 | |
| FAILURES ≦7 feet | | 0 | 0 | 0 | |
| FAILURES ≦8 feet | | 0 | 0 | 0 | |
| FAILURES ≦9 feet | | 0 | 0 | 0 | |

Tests of the densities are summarized in TABLE III.

TABLE III

| | DENSITY | |
|---|---|---|
| DESCRIPTION OF HEATSET PROCESS | Post-stretched (hot mold 30% smaller than cold mold) | Single mold (heatset method) |
| DESCRIPTION OF INSERT | Teflon insert | No Teflon insert |
| DENSITY AT 25° C. | | |
| Gate - center | 1.3530 | 1.3700 |
| Near gate (oriented portion within insert) | 1.3820 | 1.3900 |
| Position #6 (oriented portion outside the insert) | 1.3910 | 1.3922 |
| Drop Impact Test | Passes | Fails |

Thus, as shown in Table III, by utilization of the method in accordance with the invention utilizing a Teflon insert, the central portion of the base of the hemispherical heat set polyethylene terephthalate container is crystallized to a substantially lesser degree than the central portion of the base of a heat set container made by prior heat set methods without a Teflon insert. Since the central or gate area is crystallized to a much lesser degree, the container resists impact and provides excellent impact properties. The method embodying the invention obviates the problems of sticking and blow out and therefore substantially improves the productivity and performance of heat set containers.

It can thus be seen that the containers made in accordance with the method provide satisfactory drop tests characteristics and, at the same time, the plastic material at the center of the hemispherical base does not stick to the mold surface or blow out when the mold is opened.

I claim:

1. A method of forming a hollow biaxially oriented heat set partially crystalline polyethylene terephthalate container having side walls and a closed base opposite an open neck area, said closed base being of outwardly convex, hemispherical shape and comprising a major portion and a central portion surrounded by said major portion, the ratio of the diameter of said central portion of the base of the container to the diameter of the base of the container ranging from about 0.2 to 0.4, said method comprising the steps of:

closing a mold around a biaxially oriented hollow polyethylene terephthalate container, said mold having side walls and a mold base portion comprising a major mold base portion corresponds to said major portion of the base of said container and a central mold base portion corresponding to the central portion of the base of said container, maintaining the side walls and major portion of the base of the mold at a temperature in the range of form 120° C. to 250° C., which corresponds to a temperature which effects heat setting of polyethylene terephthalate, while maintaining only said central portion of the base of the mold at a temperature substantially not greater than 150° C., said central portion of the base of the mold being maintained at a temperature substantially less than the temperature of the side walls of the mold, introducing fluid pressure internally of the hollow container to maintain contact between the container and internal mold surfaces for a time sufficient to heat set and partially crystallize the side walls of the container and the major portion of the base of the container while also crystallizing the central portion of the base of the container a substantially lesser amount than the sidewalls and major portion of the base of the container, and quenching the container to preclude shrinkage thereof, said heat setting of side walls of said container and of said central and major portions of the base of the container being sufficient to prevent the container from sticking to said internal mold surfaces and to eliminate deformation of or blow out of the central portion of the base of the container upon opening of said mold while maintaining internal pressure within said container.

2. The method set forth in claim 1 wherein the side walls and major portion of the base are maintained at a heated set temperature between about 120° C. and 250° C. and the central portion of the base of the mold is maintained at a temperature between about 1° C. and 150° C. and the quench temperature is maintained between about 1° C. and 100° C.

3. The method set forth in claim 2 wherein the heat set time comprises 1–10 seconds and the quenching time comprises 0.5–10 seconds.

4. The method set forth in claim 1 wherein the expanding and heat setting area performed in a hot mold and the quenching is provided in a cold mold and said container is transferred to said cold mold while maintaining internal pressure in said container.

5. The method set forth in claim 1 wherein the expanding and heat setting are performed in the same mold.

6. The method set forth in claim 5 wherein the quenching is performed by changing the temperature of the mold.

7. The method set forth in claim 5 wherein the quenching is performed by internally cooling the container.

8. The method set forth in claim 5 wherein the quenching is performed by removing the container from the mold and cooling the container externally under internal pressure.

9. The method set forth in claim 1 wherein said step of maintaining the central portion of the mold at a temperature not greater than 150° C. is achieved by insulating the central portion of the base of the mold.

10. The method set forth in claim 1 wherein said step of maintaining the central portion of the base of the mold at a temperature not greater than 150° C. is achieved by passing cooling fluid through the central portion of the base of the mold.

* * * * *